United States Patent

Yeghiazarians

[11] Patent Number: 5,914,882
[45] Date of Patent: Jun. 22, 1999

[54] DEVICE FOR AND METHOD OF PREVENTING ACCIDENTS IN HAND-OPERATED MACHINE TOOLS DUE TO TOOL JAMMING

[75] Inventor: Vaheh Khachatouri Yeghiazarians, Feldkirch, Austria

[73] Assignee: Hilti Aktiengesellschaft, Schaan, Liechtenstein

[21] Appl. No.: 08/937,272

[22] Filed: Sep. 15, 1997

[30] Foreign Application Priority Data

Oct. 9, 1996 [DE] Germany ............................ 196 41 618

[51] Int. Cl.[6] ............................ G06F 19/00; B23B 47/24
[52] U.S. Cl. .................. 364/474.19; 364/474.1; 408/1 R; 408/6; 408/9; 706/900
[58] Field of Search .................. 364/474.01, 474.02, 364/474.1, 474.12, 474.17, 474.19; 408/1 R, 6, 9, 8; 318/602, 17; 706/900, 904, 912, 52

[56] References Cited

U.S. PATENT DOCUMENTS

| | | | |
|---|---|---|---|
| 4,820,962 | 4/1989 | Millauer | 318/602 |
| 4,839,823 | 6/1989 | Matsumoto | 706/52 |
| 5,584,619 | 12/1996 | Guzzella | 408/9 |

FOREIGN PATENT DOCUMENTS

2-95542   4/1990   Japan ................................. 364/474.1

*Primary Examiner*—William Grant
*Assistant Examiner*—Steven R. Garland
*Attorney, Agent, or Firm*—Anderson, Kil & Olick, P.C.

[57] ABSTRACT

A device for and method of preventing accidents caused by jamming of a tool when working with hand-operated machine tools driving a rotating tool, especially hammer drills, is outfitted with an interrupter device for interrupting the action of the driving motor on the rotating tool depending on the operating state detected by a deflection sensor (1). The device includes a computer unit (R) in which a probability for an expected accident is determined from the sensor signals supplied by the deflection sensor (1), and in that the interrupter device (5, 6) can be activated when a preset accident probability is exceeded. In the method rotational movement values are determined from the measurement signals supplied by the deflection sensor (1), these rotational movement values are converted in a computer unit (R) by nonlinear logic operations to form accident probabilities and activating the interrupter device as soon as the estimated accident probability exceeds a preadjustable threshold value.

20 Claims, 5 Drawing Sheets

DEVICE FOR AND METHOD OF PREVENTING ACCIDENTS IN HAND-OPERATED MACHINE TOOLS DUE TO TOOL JAMMING

BACKGROUND OF THE INVENTION

The invention is directed to a device for and a method of preventing accidents due to tool jamming when working with hand-operated machine tools driving rotating tools, such as hammer drills, outfitted with an interrupter device for interrupting the driving action of a motor for the rotating tool depending on the operating conditions detected by a deflection sensor.

A serious problem in hand-operated machine tools, especially those with higher output, such as hammer drills, involves so-called rotation accidents, such as, injuries to the wrist or falls from ladders or scaffolding, and the like, as a result of the sudden jamming of the rotating tool and the consequent rapid increase in the reaction moment at the machine. Out of the large number of known solutions devised for this problem, reference is had to DE 44 26 305 A1 and DE 43 44 817 C2.

The first reference discloses a purely mechanical solution for this safety problem with an overload slip clutch, whose releasing moment occurs at a presettable adjusting speed depending on the occurring torque, wherein the clutch does not disengage during normal, trouble-free operation. If a rapid rise in the required torque should occur in the event of malfunction, for example, when the tool is jammed, the slip clutch, which is affected by inertia or damped by volume displacement, is released and immediately interrupts the line of transmission of force from the motor of the device to the rotating tool.

The second reference discloses a mechanical-electrical solution. In this reference, an anticipated deflection angle is calculated by means of an acceleration pickup. If this deflection angle is greater than a maximum presettable deflection angle, an interrupter device, in particular an electromagnetic clutch, is released before the maximum deflection angle is reached, possibly in combination with a shutting off of power. The acceleration pickup is an angular acceleration sensor whose measurement values are converted to the expected rotational angle by double integration over the duration of a time constant.

The first solution presents difficulties in that an untimely releasing of the safety clutch can also occur as a result of intended manipulation of the machine, such as when working with a hammer drill in a concrete mass of inhomogeneous composition. This has to do with the use of passive signal evaluation, particularly because the movement sensor and actuator are comprised in one unit and purely mechanical principles are applied.

Difficulties arise in the second solution because this model-based solution is founded on a weighted addition of the instantaneous angle calculated from the measured angular acceleration with the predicted amounts of angular velocity and the angular acceleration relative to the angle occurring after the expiration of a forecast time, wherein an adjustment of the system parameters must be carried out empirically based on difficult-to-identify parameters of the process model. In this case, it is hard to modify the process model or adapt it to different machines. Further, once the process model has been set, the summation can not be weighted differently in this procedure. Thus, it may come about, for example, that the interrupter device is activated when only one of the input variables, for instance, only acceleration, is very high, although there is no risk of an accident.

SUMMARY OF INVENTION

The primary object of the present invention is to improve hand-operated machine tools of the type mentioned above in such a way that a better criterion is given for discriminating between permissible reaction moments and dangerous reaction moments which can lead to rotation accidents so as to activate a clutch such that work safety is increased appreciably when working with such a machine tool.

A device for preventing accidents caused by jamming of the rotating tool in hand-operated machine tools such as hammer drills, which are outfitted with an interrupter device for interrupting the action of the driving motor on the tool depending on the operating state detected by a deflection sensor is characterized, according to the invention, in that a computer unit is provided in which an expected accident can be estimated by nonlinear signal processing from the sensor signals supplied by the deflection sensor, and in that the interrupter device can be activated via a comparison device when a presettable accident probability is exceeded.

Accordingly, similar to DE 43 44 817 C2, the invention is based on the idea of a predictive decision about the future behavior of the machine so that countermeasures can be taken before the machine tool receives an angular momentum of such extent that an accident can no longer be prevented. In contrast to DE 43 44 817 C2 which provides an electronic evaluating unit that calculates an anticipated deflection angle of the machine tool from the sensor signal supplied by the deflection sensor over a fixed time period, wherein the interrupter device can be actuated by a comparison device when a predetermined maximum deflection angle is exceeded, the invention does not simply calculate only the anticipated deflection angle of the machine tool. The solution according to the invention uses a computer unit operating on the principle of nonlinear signal processing to estimate the anticipated accident probability so that a valuated judging of the sensor signals supplied by the deflection sensor or the signals derived therefrom can be carried out. In this way, the angular acceleration, the angular velocity, and the deflection angle covered during a determined time period can be evaluated in relation to one another as well as independently from one another, whereupon the likelihood of an accident is determined by the evaluation of judgment rules. The computer unit preferably comprises a fuzzy controller. The deflection sensor is primarily conceived as an angular acceleration sensor, such as a micromechanical angular accelerometer with a very short response time, whose measurement value signal is converted into a rotational velocity and a deflection angle by double integration over the duration of a time constant. The input signals forming the basis for the decision of the fuzzy controller about the accident probability are then the measured angular acceleration and rotational or angular velocity calculated therefrom as well as the deflection angle determined therefrom.

According to the invention, a limiting of the useful band within a range of values of 0.5 to 10 Hz for the lower limit frequency and within a range of approximately 100 to the order of magnitude of 1000 Hz for the upper limit frequency can be provided, so that the influence of ever-present low-frequency and high-frequency interference need not be taken into account exclusively by the fuzzy controller.

Similar to the known solution according to DE 43 44 817 C2, the interrupter device is chiefly conceived as an electromagnetic clutch, that is, a friction clutch, multi-disk clutch or claw clutch, which interrupts the action of the kinetic energy stored in the rotor of the motor on the jammed rotating tool spindle in a sudden manner. It has been determined through extensive measurement series, experience and experiments that there is an available decoupling time of 5 to 20 msec for this interruption, depending, among other things, on the type of device in question. This decoupling can be, and generally is, combined with a simultaneous interruption of current to the motor. For smaller machines with comparatively light rotors, a fast-acting brake device can also be considered instead of the clutch, possibly again in combination with an immediate interruption of current when the sensor signals of the deflection sensor or the signals calculated therefrom are interpreted by the fuzzy controller to mean that there is a high probability of accident.

The fuzzy controller can be realized in any known manner ensuring a timely interruption, that is, for example, by means of a program in a microprocessor, by a fuzzy processor or by means of a lookup table.

A process for preventing accidents caused by jamming in hand-operated machine tools with a rotating tool, especially hammer drills, which are outfitted with an interrupter device for interrupting the action of the driving motor on the tool depending on the operating state detected by a deflection sensor is characterized, according to the invention, in that an accident probability is determined from the measurement signals supplied by the deflection sensor by nonlinear signal processing and the interrupter device is activated as soon as the estimated accident probability exceeds a presettable threshold.

The nonlinear logic operation between the measurement signals that are converted into rotational movement quantities is preferably effected by means of a fuzzy controller.

The deflection sensor is preferably an angular accelerometer whose measurement values are converted by double integration into an angular velocity and a deflection angle with a preset time constant, wherein the fuzzy controller fuzzifies the angular acceleration, the angular velocity and the deflection angle and receives estimated values for an anticipated accident by inferencing by means of linguistic rules, which estimated values are converted into the probability of an accident by means of defuzzification.

In this way, a complicated filtering of the sensor signals and difficult determination of parameters of the integrators can be avoided by using a fuzzy controller, since, by means of fuzzy logic, inexact linguistic qualitative information can be manipulated heuristically through the use of inference rules in order to give a clear and precise finding about accident probability by superimposing a plurality of fuzzy rules with input values which do not necessarily match exactly. It is possible to determine the inference rules in a very simple manner by experimentation, and parameter changes, for example, as a result of adapting to another machine tool, can be carried out very quickly and in a very flexible manner.

The invention and advantageous particulars are explained hereinafter with reference to the drawings in an embodiment form given by way of example.

BRIEF DESCRIPTION OF THE DRAWINGS

In the drawings, shown schematically.

DETAILED DESCRIPTION OF THE INVENTION

A device for preventing accidents due to sudden jamming of the rotating tool of a hand-operated machine, especially a hammer drill, and an associated fuzzy controller with an exemplary fuzzy algorithm are described hereinafter with reference to the drawings.

Figure 1:
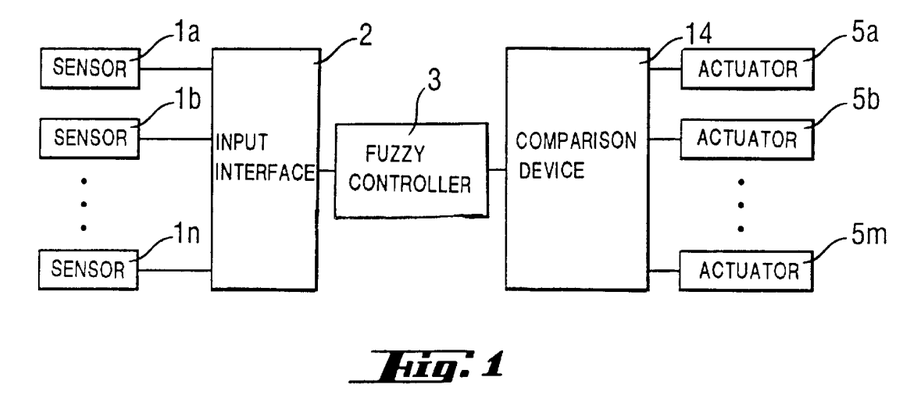
FIG. 1 is a block diagram illustrating the invention.
Figure 2:
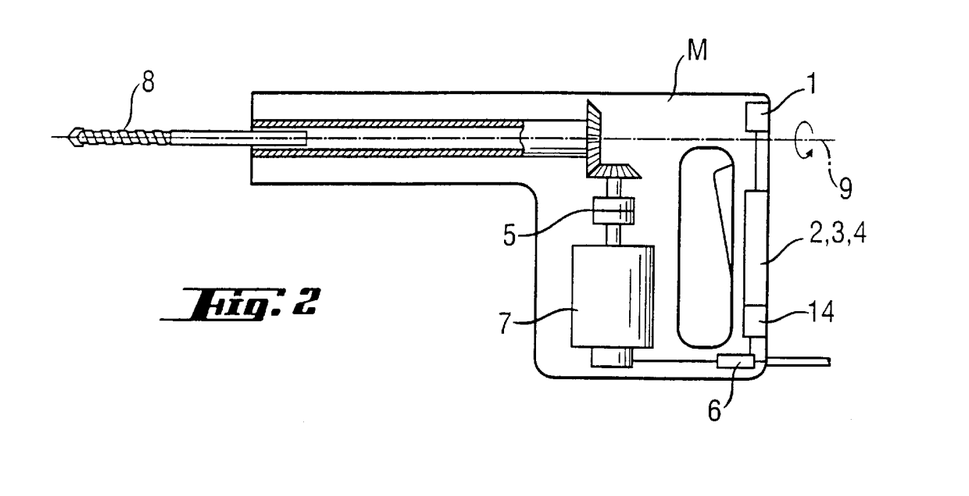
FIG. 2 is a hammer drill, as an example of a hand-operated machine tool, outfitted in accordance with the invention.

As can be seen in FIG. 1, the operating state of a hand-operated machine tool M as shown in FIG. 2, is monitored by at least one deflection sensor which can be an angular acceleration sensor, especially a micromechanical accelerometer, a linear acceleration sensor or a combination of linear acceleration sensors, a speed sensor, a path-distance sensor (translatory sensor), etc. or a torque sensor. In FIG. 1, an arrangement of deflection sensors is provided with reference numbers $1a$, $1b$..., $1n$. By way of an input interface 2 for signal shaping, analog-to-digital conversion, etc., the signal (or signals) of the sensor or sensors reaches (reach) a fuzzy controller 3 which can be realized by means of a microprocessor with a corresponding program and data storage, by means of a fuzzy processor, or by means of a lookup table which predicts the accident probability of the machine at the response of the sensor or sensors $1a$ to $1n$. An example of a definition of the linguistic variables and of a control basis and algorithm for the defuzzification and of an accident probability predicted by the fuzzy controller is explained more fully hereinafter.

When the determined accident probability exceeds a threshold value, one or more actuators, for example, a clutch $5a$ which interrupts the drive train between a driving motor 7 and the tool holder or tool shaft, a power switch $5b$, and/or a brake $5m$, are activated via a comparison device 14. These actuators 5 prevent a predicted injurious incident, especially a possible rotation accident, from actually occurring. As soon as the machine M has been changed over to a safer state for the operator, work may continue as desired by the operator.

Figure 3:
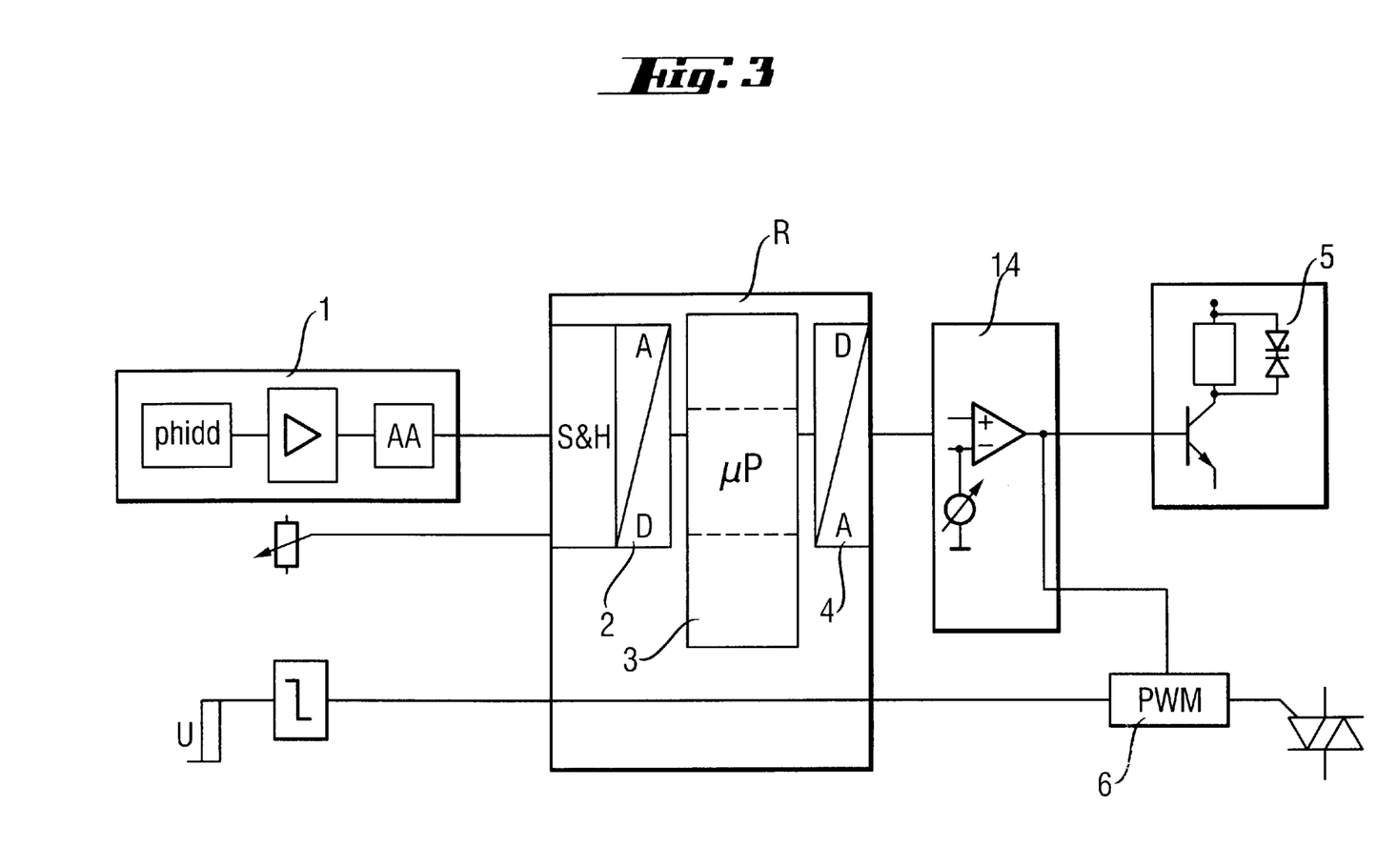
FIG. 3 is a block diagram of the drill hammer shown in FIG. 2.

The embodiment example illustrated in FIG. 2 shows a combination of an inertial angular acceleration sensor 1 followed by amplification, an anti-aliasing filter AA, note FIG. 2, a programmable microprocessor as fuzzy controller 3 with a-d converter and digital interface 2 or d-a comparison device 4, a semiconductor current switch 6, and an electromagnetically operating clutch 5. FIG. 3 shows a block diagram of the hardware which can correspond to this embodiment example. For the sake of simplicity, only the connections essential to an understanding of the invention are shown within the computer R in the drawing.

During operation of the hand-held device, high reaction torques can occur as a result of sudden jamming of a rotating tool 8 which can lead to a dangerous deflection of the hand-held device about the axis 9. According to the invention, through the use of a fuzzy control, these reaction moments are limited to a low value compatible with the safety of the operator.

For this purpose, the angular acceleration around the axis 9 is sensed by the angular acceleration sensor 1, wherein the inherent dynamics of the sensor 1 must be sufficiently fast in accordance with the above statement of problem. The response time is typically less than 1 ms. Such angular acceleration sensors are known especially in micromechanical construction and are commercially available. The measurement signals of the sensor 1 are amplified and fed to a microprocessor 3 via the a-d interface of the computer R. The digitized measurement data are converted by single and double integration to angular velocities and deflection angles. In the microprocessor 3, which comprises a program storage and a data storage, the measured and converted rotational movement quantities are further processed by means of a fuzzy algorithm which will be explained more fully hereinafter. In accordance with the results for the probability of an accident which are determined by the microprocessor 3 working as a fuzzy controller, a signal is guided, via a d-a converter 4 serving as an interface output, to the clutch 5 serving in this case as actuator and to a pulse-width modulator 6 which works as a voltage breaker and which normally adjusts the motor speed in order to interrupt the operation of the machine.

Figure 4:
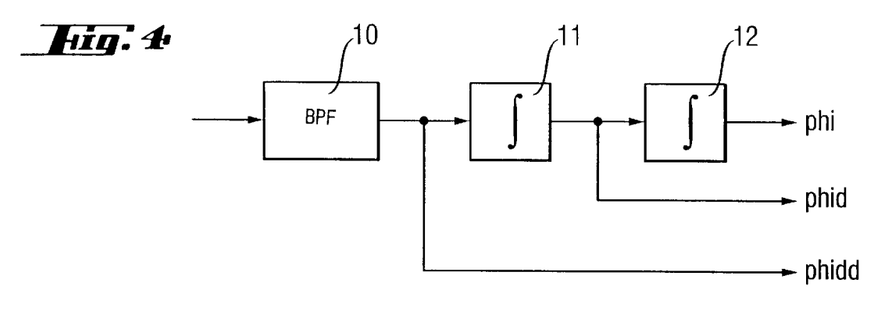
FIG. 4 is a functional block diagram showing a possible signal pre-processing using an accelerometer as a deflection sensor.

FIG. 4 shows the processing of the measurement signals sent from the sensor arrangement 1 to form rotational movement quantities characterizing the operating state. The measurement signal coming from the acceleration sensor 1 is sent via a bandpass filter 10 to an integrator 11 and subsequently to an integrator 12. Finally, the filtered angular acceleration phidd which is tapped directly behind the filter 10, the calculated angular velocity phid which is tapped behind the integrator 11, and the calculated deflection angle phi which is provided by the output signal of the integrator 12 are transmitted to the fuzzy controller. The input filter 10 which is fashioned as a bandpass filter reduces high-frequency interference and filters out possible offsets.

Figure 5:
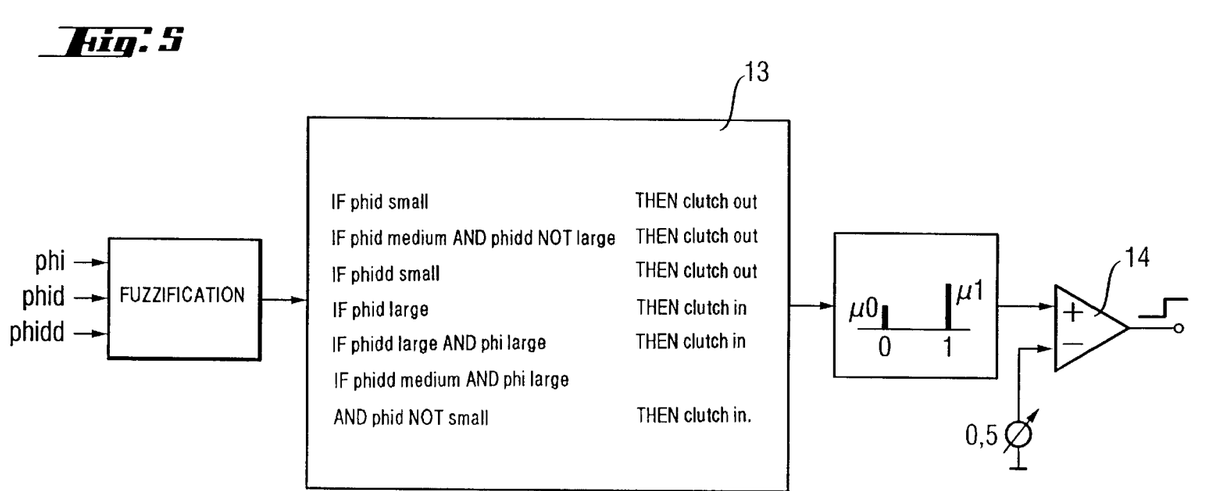
FIG. 5 is the block diagram of a possible fuzzy algorithm.
Figure 6:
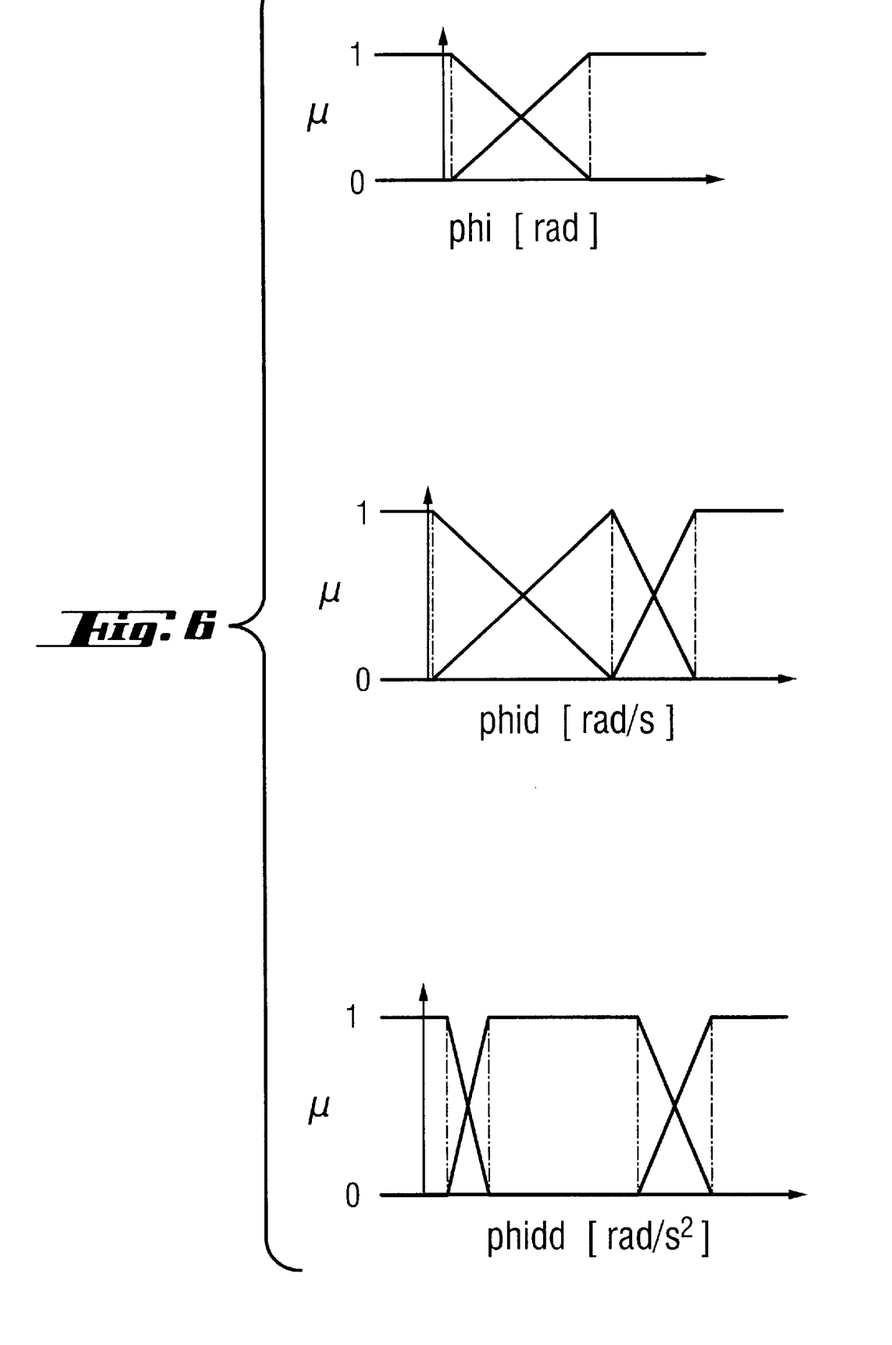
FIG. 6 is an example of a definition of the linguistic variables on which the fuzzification of the state variables is based.

The fuzzy algorithm is illustrated in principle by the definition of the linguistic variables in FIG. 6 and the block wiring diagram of the fuzzy algorithm in FIG. 5. It serves to predict the accident probability of the machine M in the case of a corresponding sensor signal. The rotational movement variables, angular acceleration phidd, angular velocity phid, and deflection angle phi characterizing the operating state are provided to the system as linguistic variables. A definition of the linguistic variables is shown by way of example in FIG. 6 with the following results:

phidd small:
  $\mu=1$, for $\infty<\text{phidd}\leq 150$ rad/s$^2$
  $\mu=1.75-1/1200\cdot\text{phidd}\cdot\text{s}^2/\text{rad}$, for $150\text{ rad/s}^2\leq\text{phidd}\leq 350\text{ rad/s}^2$
  $\mu=0$, for $350\text{ rad/s}^2\leq\text{phidd}<+\infty$
phidd medium:
  $\mu=0$, for $-\infty<\text{phidd}\leq 150$ rad/s$^2$
  $\mu=1/200\cdot\text{phidd}\cdot\text{s}^2/\text{rad}-0.75$, for $150\text{ rad/s}^2\leq\text{phidd}\leq 350\text{ rad/s}^2$
  $\mu=1$, for $350\text{ rad/s}^2\leq\text{phidd}\leq 1500\text{ rad/s}^2$
  $\mu=4-1/500\cdot\text{phidd}\cdot\text{s}^2/\text{rad}$ for $1500\text{ rad/s}^2\leq\text{phidd}\leq 2000\text{ rad/s}^2$
  $\mu=0$, for $2000\text{ rad/s}^2\leq\text{phidd}<+\infty$
phidd large:
  $\mu=0$, for $-\infty<\text{phidd}\leq 1500$ rad/s$^2$
  $\mu=1/500\cdot\text{phidd}\cdot\text{s}^2/\text{rad}-3$, for $1500\text{ rad/s}^2\leq\text{phidd}\leq 2000\text{ rad/s}^2$
  $\mu=1$, for $2000\text{ rad/s}^2\leq\text{phidd}<+\infty$ phid small:
  $\mu=1$, for $-\infty<\text{phidd}\leq 0.25$ rad/s
  $\mu=79/78-2/39\cdot\text{phidd}\cdot\text{s/rad}$, for $0.25\text{ rad/s}\leq\text{phidd}\leq 19.75$ rad/s
  $\mu=0$, for $19.75\text{ rad/s}\leq\text{phidd}<+\infty$
phid medium:
  $\mu=0$, for $-\infty<\text{phidd}\leq 0.25$ rad/s
  $\mu=2/39\cdot\text{phidd}\cdot\text{s/rad}-1/78$, for $0.25\text{ rad/s}\leq\text{phidd}\leq 19.75$ rad/s
  $\mu=1$, for $19.75\text{ rad/s}\leq\text{phid } 20$ rad/s
  $\mu=29/9-1/9\text{ phidd}\cdot\text{s/rad}$, for $20\text{ rad/s}\leq\text{phidd}\leq 29$ rad/s
  $\mu=0$, for $29\text{ rad/s}\leq\text{phidd}<+\infty$
phid large:
  $\mu=0$, for $-\infty<\text{phidd}\leq 20$ rad/s
  $\mu=1/9\text{ phidd}\cdot\text{s/rad}-20/9$, for $20\text{ rad/s}\leq\text{phidd}\leq 29$ rad/s
  $\mu=1$, for $29\text{ rad/s}\leq\text{phidd}<+\infty$
phi small:
  $\mu=1$, for $-\infty<\text{phi}<0$ degrees
  $\mu=1-2/11\cdot\text{phi}\cdot 1/\text{degrees}$, for $0\text{ degrees}\leq\text{phi}\leq 5.5$ degrees
  $\mu=0$, for $5.5\text{ degrees}\leq\text{phi}<+\infty$
phi large:
  $\mu=0$, for $-\infty<\text{phi}<0$ degrees
  $\mu=2/11\cdot\text{phi}\cdot 1/\text{degrees}$, for $0\text{ degrees}\leq\text{phi}\leq 5.5$ degrees
  $\mu=1$, for $5.5\text{ degrees}\leq\text{phi}\leq+\infty$ Due to the fuzzy algorithm, the input variables are fuzzified by the linguistic variables listed above. Results for an expected accident are then obtained by means of linguistic rules and are transformed into the probability of an accident by defuzzification. The linguistic rules can be determined as follows:

| IF phid small | THEN clutch out |
| IF phid medium AND phidd NOT large | THEN clutch out |
| IF phidd small | THEN clutch out |
| IF phid large | THEN clutch in |
| IF phidd large AND phi large | THEN clutch in |
| IF phidd medium AND phi large AND phid NOT small | THEN clutch in. |

The fuzzy variables at the output are defined as follows:
  clutch "out" $\mu 0$ is a fuzzy singleton at 0, and
  clutch "in" $\mu 1$ is a fuzzy singleton at 1.

Inferencing by means of the linguistic rules and fuzzy variables at the output is processed by the inference machine 13 on the principle of MAX-MIN inference, known per se. The formation of a maximum or $(1-\mu)$ is used to realize the logical operations AND and NOT, wherein $\mu$ stands for the truth value of the term to be negated. If the inference machine 13 generated the estimated values for clutch "out" and clutch "in" by means of the individual linguistic rules and outputted their respective maximum values, the probability for an accident can be calculated by means of a defuzzification. The defuzzification is effected according to the following equation:

$$\mu_k=\mu_1/(\mu_0+\mu_1),$$

where $\mu_0\in[0,1]$ stands for the truth value for clutch out, $\mu_1\in[0,1]$ stands for the truth value for clutch in, and $\mu_k\in(0,1)$ stands for the probability of an accident.

Thus, the result of the defuzzification is a real number from the interval [0, 1] which relates to a statement concerning the degree to which the present situation corresponds to the class "jammed drill". The closer this number is to the value 1, the truer the statement that the drill is jammed.

However, since the clutch only recognizes the "in" and "out" states, the results of the defuzzification are fed to a comparator 14 whose threshold can be varied. The output of the comparator 14 accordingly controls the active clutch for opening the drive train.

Figure 7:
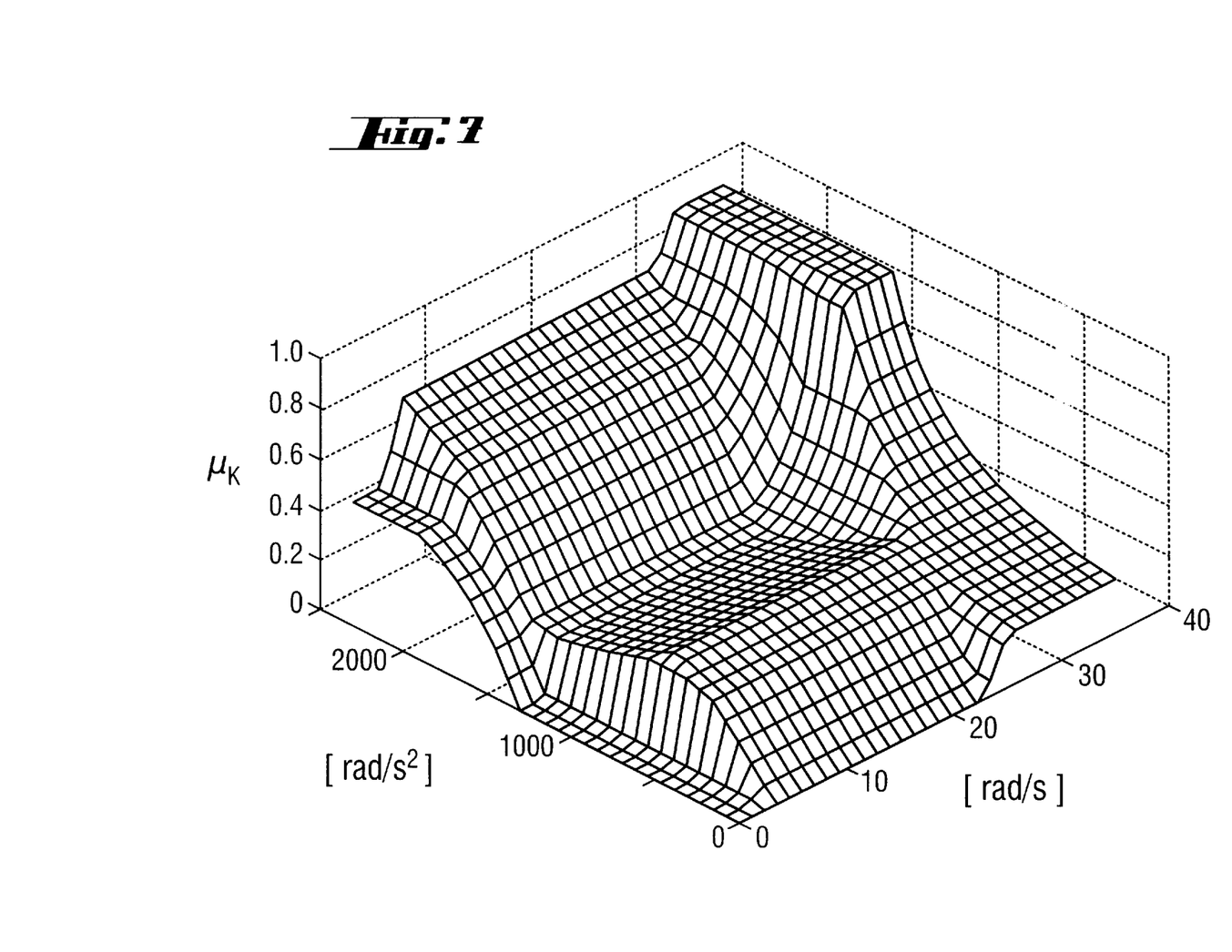
FIG. 7 is an example of a characteristic surface of the fuzzy algorithm according to FIGS. 5 and 6 as it is given before the comparator shown in FIG. 5.

FIG. 7 shows the characteristic surface of the fuzzy algorithm as it results prior to the comparator 14 at an angle phi equals 1.5° which is assumed to be constant. In this case, for the fixed angle phi equals 1.50°, the angular velocity of 0 to 40 rad/s is plotted on the x-axis, the angular acceleration of 0 to 2500 rad/s$^2$ is plotted on the y-axis, and the probability $\mu_k$ for an accident is plotted on the z-axis. FIG. 7 illustrates the complex characteristic surface of the fuzzy algorithm resulting from fuzzification, inferencing and defuzzification. If one of these three steps is modified, e.g., by means of a divergent definition of the linguistic variables, different or modified rules for inferencing or another defuzzification, the fuzzy controller can easily be adapted to other machine tools or other use requirements. In this case it would also be possible for these adaptations to be carried out during operation by the operator of the machine tool, for example, by switching existing parameter sets. The signal $\mu_k$ representing the probability of an accident is fed to the comparator 14, whose threshold is set, e.g., to 0.5.

All signals $\mu_k \leq 0.5$ are set to a value 0 and all signals $\mu_k > 0.5$ are set to a value 1 by means of the comparator 14. The clutch 5 and the pulse-width modulator 6 are then so controlled by the comparator that the drive train is opened and the action of the motor is interrupted at a signal "1" of the comparator.

An accident can be successfully prevented by means of the fuzzy algorithm. Whereas the judgment in the model-based solution according to DE 43 44 817 C2 is based purely on a weighted addition of the instantaneous deflection angle calculated from the measured angular acceleration with the predicted amounts of angular velocity and angular acceleration for the deflection angle occurring after the forecast period has expired, the fuzzy solution is based on a judgment of the system state by a nonlinear logic operation between a plurality of state variables by means of linguistic rules. The fuzzy solution makes it possible for the decision making to include optional relations between the instantaneous state variables on the one hand and the state of the system after the expiration of the forecast time on the other hand. Due to the fuzzy algorithm, it is possible for physical relationships which could be recognized as crucial for behavior during malfunction in further improving and adapting the system to be integrated within the decision making process.

While specific embodiments of the invention have been shown and described in detail to illustrate the inventive principles, it will be understood that the invention may be embodied without otherwise departing from such principles.

I claim:

1. Device for preventing accidents caused by jamming a rotating tool (8) in hand operated machine tools (M), said machine tool (M) comprising an interrupter device (5,6) for interrupting the operation of a motor for driving said rotating tool (8) depending on the operating conditions of the machine tool (M) detected by a deflection sensor (1) in said machine tool (M), a computer unit (R) within said machine tool (M) connected to said deflection sensor (1) for converting measured values received from said deflection sensor into rotational movement values characterizing the operating conditions of the machine tool and for processing the rotation movement values according to presettable criteria by nonlinear signal processing to form accident probabilities, and a comparison device (14) connected to said interrupter device (5, 6), so that said comparison device generates a signal for activating said interrupter device (5, 6) when the accident probability determined by said computer unit (R) exceeds an adjustable threshold value.

2. Device, as set forth in claim 1, wherein said computer unit (R) comprises a fuzzy controller (3).

3. Device, as set forth in claim 2, wherein said deflection sensor (1) comprises an angular accelerometer (1).

4. Device, as set forth in claim 3, wherein two band limited integrators (11, 12) are connected in a cascade arrangement, whereby said fuzzy controller (3) receives the output signal of said angular accelerometer (1) and the output signal of the integrators (11, 12) as input signals.

5. Device, as set forth in claim 4, wherein said angular accelerometer (1) is one of a piezoelectric, piezoresistive, and micromechanical accelerometer.

6. Device, as set forth in claim 4, wherein said angular accelerometer (1) comprises an electrical micromechanical composite chip having a pendulum forming a middle electrode of a differential capacitor.

7. Device, as set forth in claim 4, wherein said fuzzy controller (3) comprises a program in a microprocessor.

8. Device, as set forth in claim 4, wherein said fuzzy controller (3) comprises a lookup table.

9. Device, as set forth in claim 4, wherein said fuzzy controller (3) comprises a fuzzy processor.

10. Device, as set forth in claim 3, wherein a bandpass filter (10) and two band limited integrators (11, 12) are connected and located downstream from said angular accelerometer (1), said bandpass filter and said band-limited integrators being connected in a cascade arrangement, whereby said fuzzy controller (3) receives the filtered output signal of said angular accelerometer (1) and the output signal of said integrators (11, 12) as input signals and whereby the limiting frequencies of the overall useful frequency band processed by said fuzzy controller (3) and the two band-limited integrators (11, 12) connected in cascade arrangement lie between a lower limiting frequency $\omega_u$ in a range of 0.5 Hz<$\omega_u$<10 Hz and an upper limiting frequency $\omega_0$ in a range of 100 Hz<$\omega_0$<1000 Hz.

11. Device, as set forth in claim 3, wherein said interrupter device (5, 6) comprises a clutch (5) arranged in a drive train between said drive motor (7) and said rotating tool (8).

12. Method of preventing accidents caused by jamming a rotating tool (8) driven by a hand operated machine tool (M) and comprising an interrupter device (5, 6) in said machine tool for interrupting a rotational action on said rotating tool (8) depending on the operating state of the rotating tool detected by a deflection sensor (1) in said machine tool comprising the steps of determining rotational movement values characterizing the operating conditions of the rotating tool (8) obtained from measured values provided by said deflection sensor (1), and processing the rotational movement values in a computer unit (R) based on presettable criteria by nonlinear signal processing for forming accident probabilities, and activating said interrupter device (5, 6) as soon as the accident probability determined by the computer unit (R) exceeds an adjustable threshold value.

13. Method, as set forth in claim 12, comprising the further step of effecting nonlinear processing of the rotational movement values to form accident probabilities by a fuzzy controller provided in the computer unit (R).

14. Method, as set forth in claim 12 or 13, wherein said deflection sensor (1) is an angular accelerometer (1) having measured values and converting the measured values by double integration into an angular velocity (phid) and a deflection angle (phi) with a preset time constant.

15. Method, as set forth in claim 14, comprising the further step of fuzzifing by a fuzzy controller an angular acceleration (phidd), the angular velocity (phid) and the deflection angle (phi) and receiving estimated values for an anticipated accident by inferencing by means of linguistic rules, and converting the estimated values into a probability ($\mu_k$) of an accident by means of defuzzification.

16. Method, as set forth in claim 15, wherein linguistic variables for fuzzification are defined as follows:

angular acceleration (phidd) small: up to a value of 150 rad/s$^2$, a truth value $\mu=1$ which drops linearly between 150 rad/s$^2$ and 350 rad/s$^2$ to $\mu=0$, where it remains for higher values;

angular acceleration (phidd) medium: up to a value of 150 rad/s$^2$, a truth value=0 which increases linearly between 150 rad/s$^2$ and 350 rad/$^2$ to $\mu=1$, where it remains for higher values until it drops linearly between 1500 rad/s$^2$ and 2,000 rad/s$^2$ to $\mu=0$, where it remains for higher values;

angular acceleration (phidd) large: up to a value of 1500 rad/s$^2$, a truth value $\mu=0$ which increases between 1500 rad/s$^2$ and 2,000 rad/s$^2$ to $\mu=1$, where it remains for higher value;

angular velocity (phid) small: up to a value of 0.25 rad/s, a truth value $\mu=1$, which drops linearly between 0.25 rad/s and 19.75 rad/s to $\mu=0$, where it remains for higher values;

angular velocity (phid) medium: up to a value of 0.25 rad/s, a truth value $\mu=0$ which increases linearly between 0.25 rad/s and 19.75 rad/s to $\mu=1$, where it remains until a value of 20 rad/s and then drops linearly between 20 rad/s and 29 rad/s to $\mu=0$, where it remains for higher values;

angular velocity (phid) large: up to a value of 20 rad/s, a truth value $\mu=0$ which increases linearly between 20 rad/s and 29 rad/s to $\mu=1$, where it remains for higher values;

deflection angle (phi) small: up to a value of 0 rad, a truth value $\mu=1$ which drops linearly between 0 rad and 5.5 rad to $\mu=0$, where it remains for higher values; and deflection angle (phi) large: up to a value of 0 rad, a truth value $\mu=0$ which increases between 0 rad and 5.5 rad to $\mu=1$, where it remains for higher values.

17. Method, as set forth in claim 16, wherein fuzzy variables at the output are defined as follows:

clutch out ($\mu 0$) is a fuzzy singleton at 0; and clutch in ($\mu 1$) is a fuzzy singleton at 1.

18. Method, as set forth in claim 17, wherein the following linguistic rules apply:

IF angular velocity (phid) small THEN clutch out ($\mu 0$),

IF angular velocity (phid) medium AND (angular acceleration (phidd) NOT large) THEN clutch out, IF angular acceleration (phidd) small THEN clutch OUT ($\mu 0$), IF angular velocity (phid) large THEN clutch in ($\mu 1$), IF angular acceleration (phidd) large AND deflection angle (phi) large THEN clutch in ($\mu 1$), IF angular acceleration (phidd) medium AND deflection angle (phi) large AND (angular velocity (phid) NOT small) THEN clutch in ($\mu 1$).

19. Method, as set forth in claim 18, comprising the step of carrying out inferencing by means of Min-max inference.

20. Method, as set forth in claim 19, comprising the further step of effecting defuzzification according to the following equation:

$$\mu_k = \mu,1(\mu_0 + \mu_1)$$

where $\mu_0 \in (0,1)$ stands for the truth value for clutch out, $\mu, \in (0,1)$ stands for the truth value for the clutch in, and $\mu_k \in (0, 1)$ stands for the probability of an accident.

* * * * *